US012200273B2

(12) United States Patent
Luo (10) Patent No.: US 12,200,273 B2
(45) Date of Patent: Jan. 14, 2025

(54) LIVE STREAMING PICTURE PROCESSING METHOD AND APPARATUS BASED ON VIDEO CHAT LIVE STREAMING, AND ELECTRONIC DEVICE (71) Applicant: GUANGZHOU HUADUO NETWORK TECHNOLOGY CO., LTD., Guangdong (CN)

(72) Inventor: Feilong Luo, Guangdong (CN)

(73) Assignee: GUANGZHOU HUADUO NETWORK TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/039,243

(22) PCT Filed: Mar. 25, 2021

(86) PCT No.: PCT/CN2021/082880
§ 371 (c)(1),
(2) Date: May 27, 2023

(87) PCT Pub. No.: WO2022/110591
PCT Pub. Date: Jun. 2, 2022

(65) Prior Publication Data
US 2024/0015340 A1    Jan. 11, 2024

(30) Foreign Application Priority Data

Nov. 27, 2020   (CN) .......................... 202011364285.9

(51) Int. Cl.
H04N 21/2187    (2011.01)
G06T 7/70       (2017.01)
(Continued)

(52) U.S. Cl.
CPC .......... *H04N 21/2187* (2013.01); *G06T 7/70* (2017.01); *G06V 40/171* (2022.01); *G06V 40/20* (2022.01); *H04N 21/4318* (2013.01)

(58) Field of Classification Search
CPC .................................................... H04L 65/1093
See application file for complete search history.

(56) References Cited

U.S. PATENT DOCUMENTS

2018/0041551 A1*   2/2018   Ormseth ............. H04L 65/1093

FOREIGN PATENT DOCUMENTS

CN    104484858 A    4/2015
CN    107105311 A    8/2017
(Continued)

OTHER PUBLICATIONS

International Search Report for PCT/CN2021/082880 mailed Aug. 16, 2021, ISA/CN.

*Primary Examiner* — Anthony Bantamoi
(74) *Attorney, Agent, or Firm* — Yue (Robert) Xu; Apex Attorneys at Law, LLP (57) ABSTRACT

Provided are a method and device for processing a live streaming image based on co-hosting live streaming, an electronic device, and a computer-readable storage medium. The method includes: obtaining at least two live streaming videos for the co-hosting live streaming, and performing a face orientation recognition on at least one of the live streaming videos to determine a face orientation of a host character in the live streaming video; calculating a deviation angle between the face orientation and a preset indicating orientation; flipping the live streaming video to obtain a flipped live streaming video, in a case that the deviation angle reaches a preset angle threshold; and merging by using the flipped live streaming video to obtain a streaming video for the co-hosting live streaming.

20 Claims, 6 Drawing Sheets (51) Int. Cl.
    *G06V 40/16*     (2022.01)
    *G06V 40/20*     (2022.01)
    *H04N 21/431*     (2011.01)

(56) References Cited

FOREIGN PATENT DOCUMENTS

| | | |
|---|---|---|
| CN | 107147927 A | 9/2017 |
| CN | 107566911 A | 1/2018 |
| CN | 111970524 A | 11/2020 |
| CN | 112543343 A | 3/2021 |
| WO | 2010134066 A1 | 11/2010 |

\* cited by examiner

LIVE STREAMING PICTURE PROCESSING METHOD AND APPARATUS BASED ON VIDEO CHAT LIVE STREAMING, AND ELECTRONIC DEVICE

CROSS REFERENCE OF RELATED APPLICATION

This application is the national phase of International Application No. PCT/CN2021/082880, titled "LIVE STREAMING PICTURE PROCESSING METHOD AND APPARATUS BASED ON VIDEO CHAT LIVE STREAMING, AND ELECTRONIC DEVICE", filed on Mar. 25, 2021, which claims priority to Chinese Patent Application No. 202011364285.9, titled "LIVE STREAMING PICTURE PROCESSING METHOD AND APPARATUS BASED ON VIDEO CHAT LIVE STREAMING, AND ELECTRONIC DEVICE", filed on Nov. 27, 2020 with the China National Intellectual Property Administration, both of which are incorporated herein by reference in their entireties.

FIELD

The present disclosure relates to the technical field of live streaming, and in particular to a method and device for processing a live streaming image based on co-hosting live streaming, an electronic device, and a computer-readable storage medium.

BACKGROUND

With the development of Internet applications, users are increasingly inclined to share an anecdote with others or perform a live talent show by posting an online video live streaming or a short video. With a co-hosting live streaming service, a master host establishes, through a host terminal, a co-hosting session connection with a terminal (also referred to as an accessed terminal) of a guest host (who participates in a co-hosting live streaming together with the host). After the co-hosting session connection is established, the master host and the guest host interact with each other via audios or/and videos. Audience may view the audio and video of interactions between the master host and the guest host.

In the co-hosting live streaming technology, the host terminal obtains a live image of the master host collected by the host terminal (which is also referred to as a first live image), and obtains a live image of the guest host collected by the accessed terminal (which is also referred to as a second live image). The first live image and the second live image are scaled, cropped and re-arranged. Then, the first live image and the second live image are merged and a merged streaming video is sent to an audience terminal for display. In order to construct a realistic interactive effect, a live streaming platform provides relevant prompts to guide the host to face toward a designated direction, so as to create an effect of face-to-face interaction of the master host and the guest host on the merged image. For example, the master host stretches out a hand to the left and the guest host stretches out a hand to the right, thereby performing a handshake. In practice, the host may fail to make the movement in the designated direction. For example, the master host stretches out a hand to the right and the guest host also stretches out a hand to the right, resulting in a failed handshake. In such case, an interaction effect of hosts is degraded.

SUMMARY

An objective of the present disclosure is to solve at least one of the above-mentioned technical defects, especially a problem that incoordination of images in co-hosting live streaming affects the interaction effect of hosts.

According to a first aspect, a method for processing a live streaming image based on co-hosting live streaming is provided according to the present disclosure. The method includes: obtaining at least two live streaming videos for the co-hosting live streaming, and performing a face orientation recognition on at least one of the live streaming videos to determine a face orientation of a host character in the live streaming video; calculating a deviation angle between the face orientation and a preset indicating orientation; flipping the live streaming video to obtain a flipped live streaming video, in a case that the deviation angle reaches a preset angle threshold; and merging by using the flipped live streaming video to obtain a streaming video for the co-hosting live streaming.

In a possible embodiment, the obtaining at least two live streaming videos for the co-hosting live streaming, and performing a face orientation recognition on at least one of the live streaming videos to determine a face orientation of a host character in the live streaming video includes: obtaining, from a host terminal, a first live image sequence of a master host; obtaining, from an accessed terminal, a second live image sequence of a guest host; extracting feature key points of a face area in at least one of the first live image sequence and the second live image sequence; performing the face orientation recognition on the live streaming video based on the feature key points to obtain a face gesture of the host character in an image sequence corresponding to the extracted feature key points; and determining, based on the face gesture, the face orientation of the host character in the live streaming video.

In a possible embodiment, the calculating a deviation angle between the face orientation and a preset indicating orientation includes: estimating, based on the face orientation, a head rotation angle of the host character; and calculating a difference between the head rotation angle and a standard angle corresponding to the preset indicating orientation, to obtain the deviation angle between the face orientation and the preset indicating orientation.

In a possible embodiment, the flipping the live streaming video, in a case that the deviation angle reaches a preset angle threshold, includes: flipping, based on the deviation angle, the host character in the live streaming video in a horizontal direction, in a case that the deviation angle reaches the preset angle threshold and lasts for a preset time threshold, to obtain the flipped live streaming video.

In a possible embodiment, the flipping the live streaming video to obtain a flipped live streaming video includes: inserting a flip start marker in a video image corresponding to the live streaming video to obtain a flip start position, on detecting within a preset time period that the host character in the live streaming video starts to do a designated action; inserting a flip end marker in a video image corresponding to the live streaming video to obtain a flip end position, on detecting that the host character in the live streaming video stops doing the designated action; and flipping the host character in the live streaming video between the flip start position and the flip end position.

In a possible embodiment, the merging by using the flipped live streaming video to obtain a streaming video for the co-hosting live streaming includes: obtaining a preconfigured merging template of an image for the co-hosting live streaming; and merging, based on the merging template, the flipped live streaming video with another live streaming video participating in the co-hosting live streaming, to obtain the streaming video for the co-hosting live streaming.

In a possible embodiment, the flipped live streaming video presents a guest host; and the merging, based on the merging template, the flipped live streaming video with another live streaming video participating in the co-hosting live streaming, to obtain the streaming video for the co-hosting live streaming includes: arranging a live streaming video corresponding to a master host on a left side of the merging template, arranging the flipped live streaming video on a right side of the merging template, and merging based on the merging template to obtain the streaming video for the co-hosting live streaming.

According to a second aspect, a device for processing a live streaming image based on co-hosting live streaming is provided in the present disclosure. The device includes: a face orientation determination module, configured to obtain at least two live streaming videos for the co-hosting live streaming, and performing a face orientation recognition on at least one of the live streaming videos to determine a face orientation of a host character in the live streaming video; a deviation angle calculation module, configured to calculate a deviation angle between the face orientation and a preset indicating orientation; and a live streaming video merging module, configured to flip the live streaming video to obtain a flipped live streaming video, in a case that the deviation angle reaches a preset angle threshold, and merge by using the flipped live streaming video to obtain a streaming video for the co-hosting live streaming.

According to a third aspect, an electronic device is provided in the present disclosure. The electronic device includes a memory, a processor, and a computer program stored on the memory and executable on the processor. The processor, when executes the computer program, performs the method for processing a live streaming image based on co-hosting live streaming according to the first aspect.

According to a fourth aspect, a computer-readable storage medium is provided in the present disclosure. The computer-readable storage medium stores a computer program. The computer program, when executed by a processor, implements the method for processing a live streaming image based on co-hosting live streaming according to the first aspect.

According to the above embodiments, a method and a device for processing a live streaming image based on co-hosting live streaming, and an electronic device are provided. At least two live streaming videos for the co-hosting live streaming are obtained. The face orientation recognition is performed on at least one of the live streaming videos to determine a face orientation of a host character in the live streaming video. A deviation angle between the face orientation and a preset indicating orientation is calculated. The live streaming video is flipped to obtain a flipped live streaming video, in a case that the deviation angle reaches a preset angle threshold. The merging is performed by using the flipped live streaming video to obtain a streaming video for the co-hosting live streaming. In a situation where an action by the master host or the guest host does not comply with the preset indicating orientation, relevant images in the live streaming video are flipped. As a result, it is avoided that an interaction effect in the live streaming is influenced due to a mis-orientated action of the master host or the guest host, and thereby a success rate of interactions among hosts in the co-hosting live streaming is improved, and the interaction effects in the live streaming is improved.

Additional aspects and advantages of the present application are set forth in part in the description below, which will become apparent from the description, or may be learned from practice of the present disclosure.

BRIEF DESCRIPTION OF THE DRAWINGS

The above and/or additional aspects and advantages of the present disclosure will become apparent and easy to understand from the following description of the embodiments in conjunction with the accompanying drawings. In the drawings.

DETAILED DESCRIPTION

Embodiments of the present disclosure are described in detail below. Examples of the embodiments are shown in the drawings. Throughout the drawings, the same or similar reference signs denote the same or similar elements or elements having the same or similar functions. The embodiments described below with reference to the drawings are exemplary. The embodiments are only for explaining the present disclosure, and should not be construed as limiting the present disclosure.

Those skilled in the art can understand that, unless specifically stated, a singular form with "a", "an", "said" and "the" used herein may include a plural form. It should be further understood that the expression "comprise/include" used in the specification of the present disclosure indicates presence of a feature, integer, step, operation, element and/or component, and does not exclude presence or addition of one or more other features, integers, steps, operations, elements, components, and/or groups thereof. It should be understood that when an element is referred to as being "connected" or "coupled" to another element, the element may be directly connected or coupled to the another element, or there may be an intermediate element there between. Additionally, the "connected" or "coupled" used herein may include a wireless connection or wireless coupling. The expression "and/or" used herein includes all of or any combination of one or more listed items.

Those skilled in the art can understand that, unless otherwise defined, all terms (including technical terms and scientific terms) used herein have the same meanings as commonly understood by those of ordinary skill in the art to which the present disclosure pertains. It should be further understood that terms, such as those defined in commonly used dictionaries, should be understood having meanings consistent with their meanings in the context of the conventional technology. Unless specifically defined as herein otherwise, such terms should not be explained with an ideal or excessively formal meaning.

Before explaining the embodiments of the present disclosure in detail, an application scenario of the embodiments of the present disclosure is introduced. The method provided in the embodiments of the present disclosure is applied to a live streaming scenario of co-hosting live streaming, specifically to a scenario where a master host and a host from another live streaming room perform co-hosting live streaming, or a scenario where a master host and an audience perform co-hosting live streaming. For example, a host may interact with another host through the co-hosting live streaming to perform an interaction during a game. The interaction may include shaking hands, hugging, and other actions, for example.

Figure 1A:
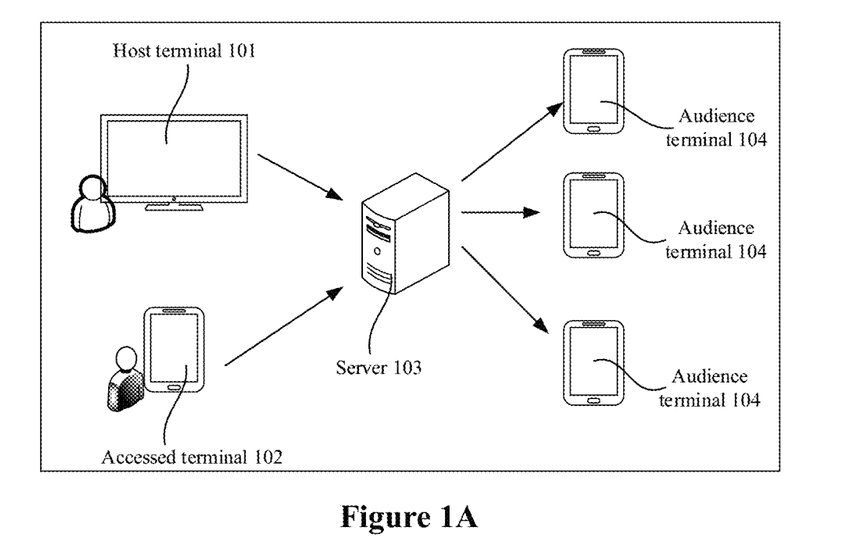
FIG. 1A is a schematic diagram of a live streaming system for co-hosting live streaming according to an embodiment of the present disclosure.

FIG. 1A is a schematic diagram of a live streaming system for co-hosting live streaming according to an embodiment of the present disclosure. Reference is made to FIG. 1A. The live streaming system includes a host terminal 101, an accessed terminal 102, and a live streaming server 103. The accessed terminal 102 is a terminal that performs co-hosting live streaming with the host terminal 101. The host terminal 101 is a terminal of a master host, and the accessed terminal 102 includes a terminal of a guest host and a terminal of an audience. A process of the co-hosting live streaming is described below. The host terminal 101 may obtain a first live streaming video collected by the host terminal and transmit the first live streaming video to the live streaming server 103. The accessed terminal 102 may obtain a second live streaming video and transmit the second live streaming video to the live streaming server 103. The live streaming server 103 obtains the first live streaming video and the second live streaming video, merges the first live streaming video and the second live streaming video to obtain a streaming video for the co-hosting live streaming, and forwards the streaming video for the co-hosting live streaming to an audience terminal 104. Hence, the co-hosing live streaming is performed based on a co-hosting live streaming image.

Figure 1B:
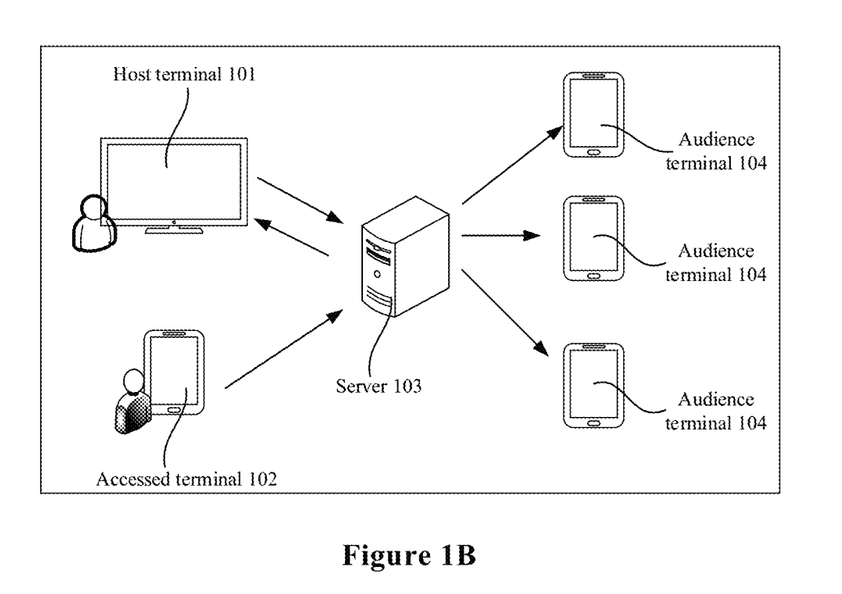
FIG. 1B is a schematic diagram of a live streaming system for co-hosting live streaming according to another embodiment of the present disclosure.

FIG. 1B is a schematic diagram of a live streaming system for co-hosting live streaming according to another embodiment of the present disclosure. Reference is made to FIG. 1B. The live streaming system includes a host terminal 101, an accessed terminal 102, and a live streaming server (or, server) 103. The accessed terminal 102 is a terminal that performs co-hosting live streaming with the host terminal 101. The host terminal 101 is a terminal of a master host, and the accessed terminal 102 includes a terminal of a guest host and a terminal of an audience. A process of the co-hosting live streaming is described below. The host terminal 101 may obtain a first live streaming video collected by the host terminal. The accessed terminal 102 may obtain a second live streaming video of a guest host and transmit the second live streaming video to the live streaming server 103. The host terminal 101 obtains the second live streaming video from the live streaming server 103, merges the first live streaming video with the second live streaming video to obtain a streaming video for the co-hosting live streaming, and transmits the streaming video for the co-hosting live streaming to the live streaming server 103. The live streaming server 103 forwards the streaming video for the co-hosting live streaming to an audience terminal 104. Hence, the co-hosing live streaming is performed based on a co-hosting live streaming image.

It should be noted that the host terminal 101, the master host, the accessed terminal 102, and the guest host are relative concepts. Generally, when an audience enters a live streaming room, a host corresponding to the live streaming room is referred to as the master host, and a terminal corresponding to the master host is referred to as the host terminal. Any other host not belonging to the live streaming room is referred to as the guest host, and a terminal corresponding to the guest host is referred to as an accessed terminal.

Figure 1C:
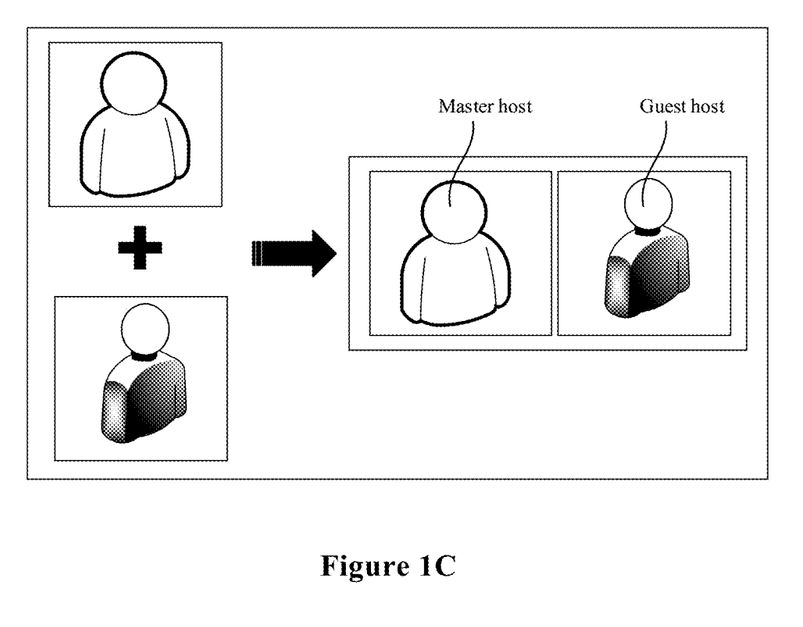
FIG. 1C is a schematic diagram of a merged image in co-hosting live streaming according to a related technology.

According to a related technology, the host terminal 101 collects the first live streaming video, and the accessed terminal 102 collects the second live streaming video. The first live streaming video and the second live streaming video are transmitted to the live streaming server 103. The first live streaming video and the second live streaming video are merged through the live streaming server 103 based on a preconfigured merging template of a live streaming image for the co-hosting live streaming, so as to obtain the streaming video for the co-hosting live streaming. In the merging template, the first live streaming video collected by the host terminal 101 is fixedly arranged on a left side of the merging template and the second live streaming video collected by the accessed terminal 102 is fixedly arranged on a right side of the merging template. Hence, the live streaming image for the co-hosting live streaming is obtained. The master host and the guest host perform an interactive operation in a live streaming activity. For example, to make a handshake, the master host stretches out a hand to the right, and the guest host stretches out a hand to the left, so that the handshake is realized. However, a host may fail to act along an indication orientation given by the live streaming platform. Reference is made to FIG. 1C, which is a schematic diagram of a merged image in co-hosting live streaming according to a related technology. As shown in FIG. 1C, for example, the master host stretches out a hand to the right, and the guest host also stretches out a hand to the right. In this case, a simple merge of the first live streaming video and the second live streaming video results in a failed handshake since the hand of the master host is not stretched out towards the hand of the guest host, so that an interaction effect of the live streaming is influenced.

The method and device for processing a live streaming image based on co-hosting live streaming, and the electronic device provided in the present disclosure are intended to solve the above technical problems in the conventional technology.

The technical solution of the present disclosure and how the technical solutions of the present disclosure solve the above technical problems are described in detail below with specific embodiments. The following specific embodiments may be combined with each other, and the same or similar concepts or processes may not be repeated in some embodiments.

The embodiments of the present disclosure are described in detail below with reference to the drawings.

Figure 2:
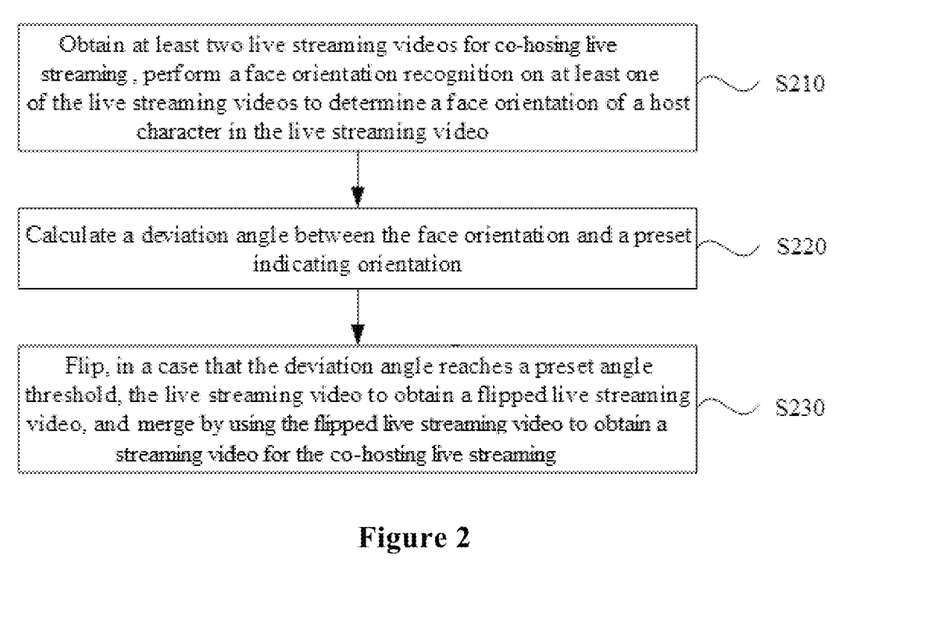
FIG. 2 is a flow chart of a method for processing a live streaming image based on co-hosting live streaming according to an embodiment.

FIG. 2 is a flow chart of a method for processing a live streaming image based on co-hosting live streaming according to an embodiment. The method is applied to a host terminal or a live streaming server. The following description is made by taking the live streaming server as an example.

Specifically, as shown in FIG. 2, the method for processing a live streaming image based on co-hosting live streaming may include the following steps S210 to S230.

In S210, at least two live streaming videos for the co-hosting live streaming are obtained, and a face orientation recognition is performed on at least one of the live streaming videos to determine a face orientation of a host character in the live streaming video.

In the present disclosure, the co-hosting live streaming may be performed by one master host and one guest host or audience, or by one master host and multiple guest hosts or audience. The technical solution is explained below based on the co-hosting live streaming performed by a master host and a guest host.

The server obtains at least two live streaming videos that are for the co-hosting live streaming. The live streaming videos include a first live streaming video corresponding to the master host and a second live streaming video corresponding to the guest host.

In an implementation, the face orientation recognition may be performed on the second live streaming video collected by the accessed terminal. In co-hosting live streaming with multiple participants, the face orientation recognition may be performed on multiple second live streaming videos collected by accessed terminals. In an implementation, the face orientation recognition may be performed on merely the first live streaming video collected by the host terminal. Alternatively, the face orientation recognition may be performed on both the first live streaming video collected by the host terminal and the second live streaming video collected by the accessed device.

The face orientation recognition is for determining a face orientation of a host character in a video image. Positions of eyes in an image are different in a case that the host character faces toward different directions. In an implementation, feature information describing a position of an eye in a video image may be extracted through the Sobel edge operator and used as an input to a preset neural network, such as the learning vector quantization (LVQ) neural network. The face orientation is used as an output of the neural network. Images in a training set are trained by using a Matlab toolbox, so as to obtain a network with functions of prediction and recognition. Thereby, determination and recognition can be made on a given face image.

It is apparent that the face orientation of the host character in the live streaming video may be determined in other approaches. For example, key points of a face area are extracted, and the face orientation is determined based on positions of the key points. Alternatively, a gazing direction of an eye may be detected, and the face orientation may be determined based on the gazing direction.

In S220, a deviation angle between the face orientation and a preset indicating orientation is calculated.

In an embodiment, the face orientation corresponds to a rotation angle. The rotation angle may be based on a spatial position, or may be based on a two-dimensional plane.

The preset indicating orientation may be a prompt sent to a live streaming room of the host from a live streaming platform. For example, in a case that two hosts in the co-hosting live streaming need to complete a handshake task, a message that prompts the hosts to stretch out their hands in a preset indicating direction is sent to the live streaming room of the co-hosting live streaming based on the handshake task. In this embodiment, the preset indicating orientation may be a reference orientation, an approximate rotation angle, or an angle range.

An angle corresponding to the preset indicating orientation may be preset, for ease of calculating the deviation angle between the face orientation and the preset indicating orientation. For example, a preset indicating orientation towards the left front may be considered as a direction rotated by 45 degrees from the front to the left. In a case that the preset indicating direction is an angle range, a median of the angle range is determined as the angle corresponding to the preset indicating orientation.

In an embodiment of the present disclosure, the step S220 of calculating the deviation angle between the face orientation and the preset indicating orientation may include the following steps S2201 to S2202.

In S2201, a head rotation angle of the host character is estimated based on the face orientation.

In an embodiment, information of the head rotation angle of the host character is obtained based on the face orientation. The head rotation angle may be generally represented as a rotation matrix, a rotation vector, a quaternion, or an Euler angle.

In S2202, a difference between the head rotation angle and a standard angle corresponding to the preset indicating orientation is calculated to obtain the deviation angle between the face orientation and the preset indicating orientation.

In an embodiment, the head rotation angle corresponding to the face orientation is determined based on the face orientation. The angle corresponding to the preset indicating orientation is compared to the head rotation angle, and the difference between the face rotation angle and the angle corresponding to the preset indicating orientation is calculated, so as to obtain the deviation angle between the face orientation and the preset indicating orientation.

In S230, the live streaming video is flipped to obtain a flipped live streaming video, in a case that the deviation angle reaches a preset angle threshold; and the flipped live streaming video is merged with the other live streaming video to obtain a streaming video for the co-hosting live streaming.

The preset angle threshold includes a preset angle orientation and a preset angle magnitude. The flipped live streaming video refers to a live streaming video after a flipping process. A partial area in the video, such as an area where the host character is located, may be flipped, or an entire image in the video may be flipped.

In an embodiment, in a case that the deviation angle reaches the preset angle threshold, for example, in a case that the face orientation is different from the preset angle orientation, and the deviation angle reaches the preset angle value, it is determined that an action of the host character in the live streaming video has a deviation and needs to be corrected. In an embodiment, a live image of the accessed guest host may be flipped, or a live image of the master host may be flipped, or both the live image of the accessed guest host and the live image of the master host may be flipped, so as to correct the face orientation of the host character in the live image to be consistent with the preset indicating orientation. Thereby, the flipped live streaming video is obtained.

In another embodiment of the present disclosure, in a case that the deviation angle reaches a preset angle threshold and lasts for a preset time threshold, the host character in the live streaming video is flipped in a horizontal direction based on the deviation angle, so as to obtain the flipped live streaming video.

In an embodiment, the live streaming video is flipped under a condition that the deviation angle reaches the preset angle threshold and a time period during which the deviation angle reaches the preset angle threshold reaches the preset time threshold. In this way, it can be avoided that the live streaming video is flipped in a case that the deviation angle of the host reaches the preset angle threshold for a short time period. Therefore, a feeling of image flashing is avoided, and influence on a visual effect of an audience user is avoided.

Further, the flipped live streaming video is obtained by flipping the host character in the live streaming video in the horizontal direction based on the deviation angle, that is, through a horizontal mirroring processing. For example, the angle corresponding to the face orientation of the host character in the live streaming video is toward the right front, and the preset indicating orientation is towards the right front. A central axis between the right front orientation and the right front orientation is calculated based on the deviation angle. The live streaming video is mirrored by using the central axis as an axis of symmetry. Hence, the flipped live streaming video is obtained.

In an embodiment, the step S230 of merging by using the flipped live streaming video to obtain a streaming video for the co-hosting live streaming may include the following steps (1) to (3).

In step (1), a preconfigured merging template of an image for the co-hosting live streaming.

In general, a live streaming application program may pre-configure a merging template of an image for the co-hosting live streaming, so that an image of the master host is displayed at a fixed position. For example, in co-hosting live streaming with two hosts, a first live streaming video corresponding to the master host is displayed fixedly on the left side of the merging template, and a second live streaming video corresponding to the guest host is displayed fixedly on the right side of the merging template. In co-hosting live streaming with four hosts, a first live streaming video corresponding to the master host is displayed fixedly on the upper left of the merging template, and second live streaming videos corresponding to guest hosts are displayed fixedly on the upper right, the lower left, and the lower right of the merging template, respectively.

In step (2), the flipped live streaming video is merged, based on the merging template with the other live streaming video participating in the co-hosting live streaming, so that the streaming video for the co-hosting live streaming is obtained.

In an embodiment, it is necessary to determine whether the flipped live streaming video (i.e., the live streaming video after a flipping processing) corresponds to a first live streaming video representing the master host or a second live streaming video presenting the guest host. Based on positions of the first live streaming video and the second live streaming video in the merging template, the flipped live streaming video and the other live streaming video participating in the co-hosting live streaming are arranged at the positions for merging. Hence, the streaming video for the co-hosting live streaming is obtained.

Further, the streaming video obtained after merging is sent to an audience terminal for display. The audience terminal accesses the live streaming room of the master host. Viewing from the audience terminal, the first live streaming video corresponding to the master host is displayed fixedly on a left side of an interface for the live streaming, and the second live streaming video corresponding to the guest host is displayed fixedly on a right side of the interface for the live streaming.

For example, in an embodiment, the flipped live streaming video is obtained from the live streaming video of the guest host (i.e. the second live streaming video), and the other live streaming video participating in the co-hosting live streaming is the first live streaming video corresponding to the master host (i.e., the first live streaming video). With the merging template, the merging processing is performed by arranging the first live streaming video on the left side of the merging template, and arranging the flipped live streaming video (i.e., the second live streaming video after flipping) on the right side of the merging template. Hence, the streaming video for the co-hosting live streaming is obtained.

Figure 3A:
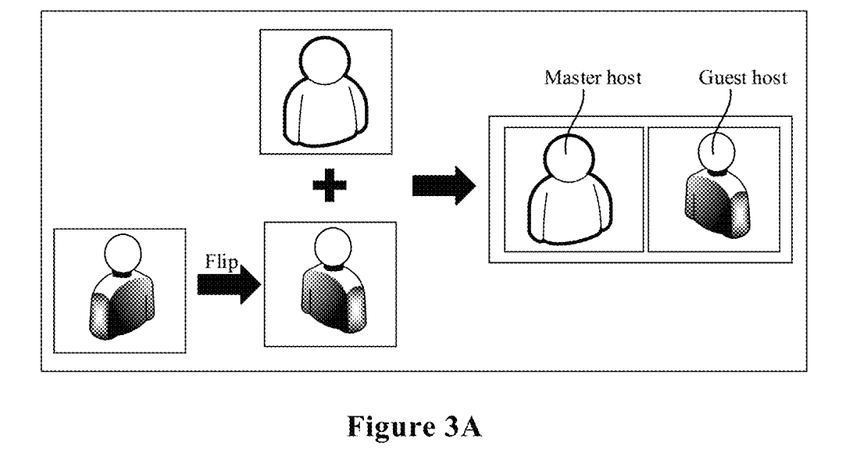
FIG. 3A is a first schematic diagram of a merged image in co-hosting live streaming according to an embodiment of the present disclosure.

FIG. 3A is a first schematic diagram of a merged image in co-hosting live streaming according to an embodiment of the present disclosure. Reference is made to FIG. 3A. For example, viewing from the audience terminal, the master host stretches out the right hand towards the right front to make a handshake with the guest host. In a case that the guest host stretches out the left hand towards the right front, it is detected that a face orientation of the guest host does not comply with the preset indicating orientation. Hence, a mirror flip along the horizontal direction is performed on the second live streaming video of the guest host. Thereby, viewing from the audience terminal, the guest host stretches out the left hand towards the left front, so that the master host and the guest host face to each other and act for the handshake.

Figure 3B:
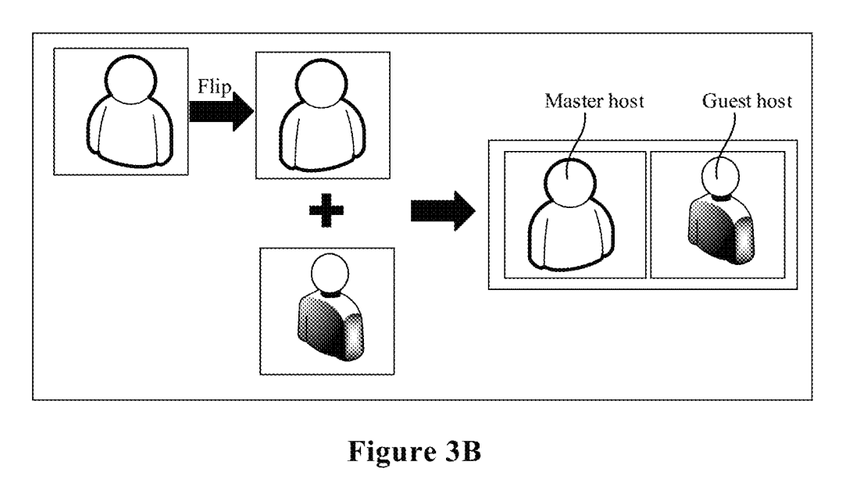
FIG. 3B is a second schematic diagram of a merged image in co-hosting live streaming according to a embodiment of the present disclosure.

In another embodiment, the flipped live streaming video is obtained from the first live streaming video corresponding to the master host. With the merging template, the merging processing is performed by arranging the flipped live streaming video (i.e., the first live streaming video after flipping) on the left side of the merging template, and arranging the other live streaming video participating in the co-hosting live streaming (i.e., the second live streaming video corresponding to the guest host) on the right side of the merging template. Hence, the streaming video for the co-hosting live streaming is obtained.

FIG. 3B is a second schematic diagram of a merged image in co-hosting live streaming according to an embodiment of the present disclosure. Reference is made to FIG. 3B. For example, viewing from the audience terminal, the master host stretches out the right hand towards the left front, and the guest host stretches out the left hand towards the left front, in order to make a handshake. It is detected that a face orientation of the master host does not comply with the preset indicating orientation. Hence, a mirror flip along the horizontal direction is performed on the first live streaming video of the master host. Thereby, viewing from the audience terminal, the master host stretches out the left hand towards the right front, and the guest host stretches out the left hand towards the left front. Thereby, the master host and the guest host face to each other and act for the handshake.

Figure 3C:
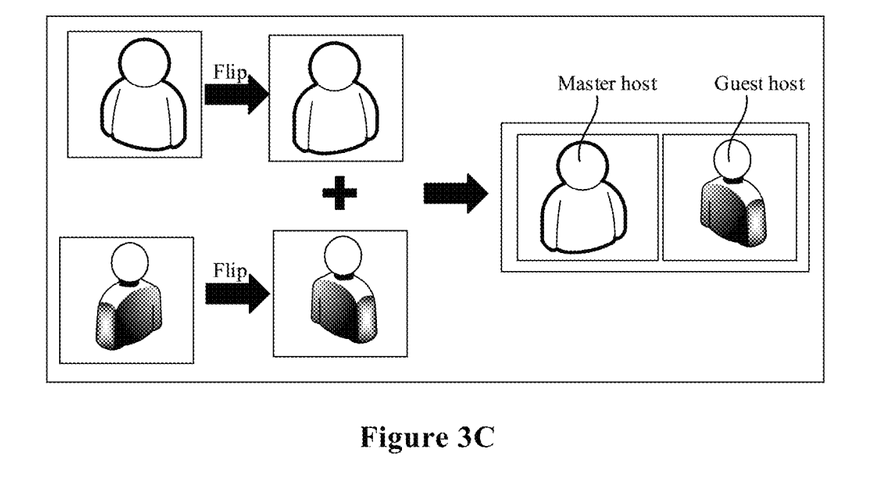
FIG. 3C is a third schematic diagram of a merged image in co-hosting live streaming according to an embodiment of the present disclosure.

In yet another embodiment, the flipped live streaming video is obtained from both the first live streaming video corresponding to the master host and the second live streaming video corresponding to the guest host. With the merging template, the merging processing is performed by arranging the flipped first live streaming video on the left side of the merging template, and arranging the flipped second live streaming video on the right side of the merging template. Hence, the streaming video for the co-hosting live streaming is obtained.

FIG. 3C is a third schematic diagram of a merged image in co-hosting live streaming according to an embodiment of the present disclosure. Reference is made to FIG. 3C. For example, viewing from the audience terminal, the master host stretches out the right hand towards the left front, and the guest host stretches out the left hand towards the right front, in order to make a handshake. It is detected that face orientations of the master host and the guest host do not comply with preset indicating orientations, respectively. Hence, a mirror flip along the horizontal direction is performed on each of the first live streaming video of the master host and the second live streaming video of the guest host. Thereby, viewing from the audience terminal, the master host stretches out the left hand towards the right front, and the guest host stretches out the left hand towards the left front. Thereby, the master host and the guest host face to each other and act for the handshake.

In the method for processing a live streaming image for co-hosting live streaming according to the embodiments of the present disclosure, at least two live streaming videos for the co-hosting live streaming are obtained; the face orientation recognition is performed on at least one of the live streaming videos to determine a face orientation of a host character in the live streaming video; a deviation angle between the face orientation and a preset indicating orientation is calculated; the live streaming video is flipped to obtain a flipped live streaming video, in a case that the deviation angle reaches a preset angle threshold; and merging is performed by using the flipped live streaming video to obtain a streaming video for the co-hosting live streaming. With this method, a relevant image in the live streaming video is flipped in a case that an action made by the master host or the co-host does not comply with a preset indicating orientation. As a result, it is avoided that a mis-orientated action of the master host or the guest host affects an interaction effect in the live streaming.

In order to explain the technical solutions of the present disclosure more clearly, the steps of the method for processing a live streaming image based on co-hosting live streaming are further described below.

In an embodiment, the step S210 of obtaining at least two live streaming videos for the co-hosting live streaming and performing a face orientation recognition on at least one live streaming video to determine a face orientation of a host character in the live streaming video may include the following sub-steps.

In S2101, a first live image sequence of a master host is obtained from a terminal of the master host, and a second live image sequence of a guest host is obtained from a terminal of the guest host.

The first live image sequence includes multiple video images sequentially from the live streaming video of the master host collected by the terminal of the master host. The second live image sequence includes multiple video images sequentially from the live streaming video of the guest host collected by the terminal of the guest host.

In an embodiment, the first live image sequence and the second live image sequence may be captured during an interaction task performed by a host.

In S2102, feature key points of a face area in at least one of the first live image sequence and the second live image sequence are extracted.

The face recognition is performed on the first live image sequence and the second live image sequence, so as to determine face areas in the first live image sequence and the second live image sequence. Detection of key points of a face is performed by applying a related algorithm. Generally, a common detection model detects 68 key points. In this model, a chin has 8 feature key points, a nose tip has 30 feature key points, a left eye corner has 36 feature key points, a right eye corner has 45 feature key points, a left mouth corner has 48 feature key points, and a right mouth corner has 54 feature key points.

In an embodiment, a scale-invariant feature transform (SIFT) algorithm may be applied for extracting a face area from at least one of the first live image sequence or the second live image sequence. The SIFT algorithm is a machine vision algorithm for detecting and describing a local feature in an image. With the SIFT algorithm, extreme points are searched in a spatial scale, in order to extract positions, scales, and rotation invariants of the extreme points.

Alternatively, the feature key points in the face area may be extracted through other methods. For example, features of an edge and corner point in the local area may be extracted by using a Susan operator. The Susan operator, depending on its characteristic, can be applied for detecting an edge and extracting a corner point. Therefore, the Susan operator is suitable for extracting features of an eye or mouth from the face area, for example, especially for automatic positioning of corner points of the eye and mouth.

In other embodiments, a large number of face images may be learned through a neural network model, so that feature key points of the face area are automatically extracted.

In S2103, a face gesture of the host character in an image sequence is obtained based on the feature key points corresponding to the image sequence.

To estimate the face gesture, it is mainly necessary to obtain information of an angle corresponding to the face orientation. Generally, the angle may be represented as a rotation matrix, a rotation vector, a quaternion, or as Euler angle (these four representations may be converted mutually). In the following embodiment, description is made by using the Euler angle for estimating the face gesture.

In an embodiment, the face gesture may be obtained in the following manner.

1) First, a 3D face model having n key points is defined, where n may be defined based on an actual accuracy. For example, a 3D face model having 6 key points (which are left eye corner, right eye corner, nose tip, left mouth corner, right Mouth corners, and lower jaw) is defined.

2) A face detection and facial key point detection is performed to obtain 2D facial key points corresponding to the 3D face model.

3) A solvePnP function based on Opencv is applied to obtain a rotation vector.

4) The rotation vector is converted to an Euler angle.

A process of deriving a rotation vector based on the solvePnP function from Opencv and converting the rotation vector into the Euler angle is conventional for detecting a face gesture. Specific operations in the method can be known by those skilled in relevant fields, which are not described in detail here.

In another embodiment of the present disclosure, the SIFT algorithm may be further applied to perform key point detection and feature matching on sequence images, to obtain posture information of a host terminal or accessed terminal when capturing an image sequence. Further, the face gesture of the host character in the image sequence is obtained based on the posture information of a host terminal or accessed terminal when capturing an image sequence.

The posture information of a host terminal or accessed terminal when capturing an image sequence may be obtained in the manner below.

1. A first stage is to extract key points through the SIFT algorithm, which may include the following four steps (1) to (4).

In step (1), extreme points in a scale space are found by using difference of Gaussians (DoG) and the image pyramid.

In step (2), extreme points having sub-pixel precision are obtained. Due to an edge response of a DoG operator, it is necessary to remove key points having low-contrast and edge response points which are unstable.

In step (3), the remaining extreme points are defined as key points, a window is set, and directions of the feature points are defined by using image gradients and amplitudes in the window.

In step (4), SIFT feature vectors are generated by rotating in the directions. Influence of scale change, rotation, and other geometric deformation factors are eliminated for the SIFT vectors. For example, the feature vectors are normalized, so as to further reduce influence of illumination changes.

2. A second stage is to match the key point features.

In an embodiment, a ratio of a distance to the nearest feature point to a distance to a second nearest feature point is used as a determination criterion. The nearest feature point has a shortest Euclidean distance to a sample feature point. The second nearest feature point has a second shortest Euclidean distance to the sample feature point.

The ratio of a distance to the nearest feature point to a distance to a second nearest feature point is calculated and compared with a set threshold, to determine a similarity between a pair of SIFT feature points. The pair of SIFT feature points are successfully matched each other in a case that the ratio is less than the threshold. The SIFT feature points are failed to match each other, in a case that the ratio is greater than or equal to the threshold. Hence, a set of matched pairs of points is obtained.

3. A third stage is to calculate the posture information of a host terminal or accessed terminal when capturing an image sequence by using a projection matrix in combination with the set of matched pairs of points.

The posture information includes a position and a gesture. The position may be represented as position coordinates based on a coordinate system of a camera. The gesture may be represented by orientation information based on the coordinate system of a camera.

The above steps are performed to obtain the posture information of each image frame in the image sequence captured by the host terminal or accessed terminal. The posture information includes a position and a gesture when the host terminal or accessed terminal capturing an image frame. The posture information may be understood as a coordinate and rotation angle of a camera in a coordinate system of the camera.

Further, the face gesture of the host character in the image sequence is obtained through a reverse derivation based on the posture information of each image frame in the image sequence captured by the host terminal or accessed terminal.

In S2104, the face orientation of the host character in the live streaming video is determined based on the face gesture.

The face gesture includes an angle of the face orientation of the host character in the live streaming video. In an embodiment, the face gesture includes a representation of three Euler angles, i.e., pitch, yaw, and roll. A pitch angle indicates that an object rotates around an x-axis; a yaw angle indicates that the object rotates around a y-axis; and a roll angle indicates that the object rotates around a z-axis.

In an embodiment, one of the three Euler angles is used to indicate the face orientation of the host character. For example, the yaw angle is used to indicate the face orientation of the host character. Alternatively, a comprehensive calculation is performed on two of the three Euler angles, and a result is used to indicate the face orientation of the host character. Alternatively, a comprehensive calculation is performed on the three Euler angles, and a result is used to indicate the face orientation of the host character.

In an embodiment, the step S230 of flipping the live streaming video to obtain a flipped live streaming video may include the following sub-steps.

In S2301, a flip start marker is inserted to a video image corresponding to the live streaming video to obtain a flip start position, on detecting within a preset time period that the host character in the live streaming video starts to do a designated action.

The preset time period may preset by the system for the guest host to complete a designated interaction, or may be set by the master host or the guest host. The designated action may be determined based on an interactive action that a co-hosting host needs to perform, and may be a head rotation, a handshake, and the like to be made by the master host or the guest host. In this embodiment, the designated action is specified for triggering a flipping processing of a video.

On detecting within the preset time period that the guest host in the co-hosting live streaming video corresponding to the guest host starts to do a designated action, a flip start marker is inserted to the video image where the designated action occurs in the co-hosting live streaming video. A position of the inserted flip start marker in the video image frame is determined as the flip start position.

In S2302, a flip end marker is inserted to a video image corresponding to the live streaming video to obtain a flip end position, on detecting that the host character in the live streaming video stops doing the designated action.

It is detected whether the host character in the live streaming video stops doing the designated action. For example, in a case that the host character used to stretching out a hand towards the right front, it is determined that the host character stops doing the designated action when it is detected that the host character no longer stretches out the hand towards the right front. In such case, a first frame of or a previous frame before the host character stopping doing the designated action (i.e., the last frame where the designated action exists) is detected, and the flip end marker is inserted to this video image frame. A position of the flip end marker in the video image frame is determined as the flip end position.

In S2303, the host character in the live streaming video between the flip start position and the flip end position is flipped.

In this embodiment, video images between a video image on which the flipping starts and a video image on which the flipping ends are continuous multi-frame video images in which the host user keeping doing the designated action in a wrong orientation. The host character in the continuous multi-frame video images is flipped, for example, in a horizontal mirroring direction. The flipped video image is transmitted along with the live streaming video.

The above examples are only intended to assist in explaining the technical solutions of the present disclosure, illustrated content and specific processes involved in the example do not constitute a limitation on an application scenario of the technical solutions of the present disclosure.

Embodiments of a device for processing a live streaming image based on co-hosting live streaming is described in detail below.

Figure 4:
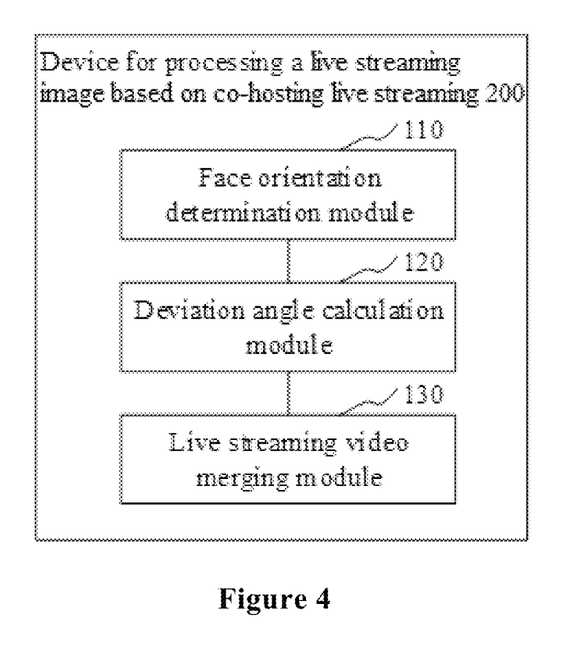
FIG. 4 is a schematic structural diagram of a device for processing a live streaming image based on co-hosting live streaming according to an embodiment of the present disclosure.

FIG. 4 is a schematic structural diagram of a device for processing a live streaming image based on co-hosting live streaming according to an embodiment of the present disclosure. The device may be implemented on a host terminal or server end. The following description is made by using the server end as an example.

As shown in FIG. 4, the device for processing a live streaming image based on co-hosting live streaming 200 includes a face orientation determination module 210, a deviation angle calculation module 220, and a live streaming video merging module 230.

The face orientation determination module 210 is configured to obtain at least two live streaming videos for the co-hosting live streaming, and perform a face orientation recognition on at least one of the live streaming videos to determine a face orientation of a host character in the live streaming video.

The deviation angle calculation module 220 is configured to calculate a deviation angle between the face orientation and the preset indicating orientation.

The live streaming video merging module 230 is configured to flip the live streaming video to obtain a flipped live streaming video, in a case that the deviation angle reaches a preset angle threshold, and merge by using the flipped live streaming video to obtain a streaming video for the co-hosting live streaming.

In the device according to the embodiment of the present disclosure, the face orientation determination module 210 obtains at least two live streaming videos for the co-hosting live streaming, and performs the face orientation recognition on at least one of the live streaming videos to determine a face orientation of a host character in the live streaming video; the deviation angle calculation module 220 calculates the deviation angle between the face orientation and the preset indicating orientation; and the live streaming video merging module 230 flips the live streaming video to obtain a flipped live streaming video, in a case that the deviation angle reaches a preset angle threshold, and performs merging by using the flipped live streaming video to obtain the streaming video for co-hosting live streaming. Hence, a quick flip of relevant images in a live streaming video can be realized in a case that an action of a master host or guest host does not comply with a preset indicating orientation. As a result, it is avoided that interactivity is influenced due to a mis-orientation of an action from the master host or guest host, and thereby a success rate of interactions among hosts in the co-hosting live streaming is improved, and the interactive effects in the live streaming room is improved.

In a possible implementation, the face orientation determination module 210 includes an image sequence obtaining unit, a key point extraction unit, a face gesture obtaining unit, and a face orientation determination unit.

The image sequence obtaining unit is configured to obtain, from a host terminal, a first live image sequence of a master host; and obtain, form an accessed terminal, a second live image sequence of a guest host. The key point extraction unit is configured to extract feature key points of a face area in at least one of the first live image sequence and the second live image sequence. The face gesture obtaining unit is configured to perform the face orientation recognition on the live streaming video based on the feature key points to obtain a face gesture of the host character in an image sequence corresponding to the extracted feature key points. The face orientation determination unit is configured to determine, based on the face gesture, the face orientation of the host character in the live streaming video.

In a possible implementation, the deviation angle calculation module 220 includes a rotation angle estimation unit and a deviation angle obtaining unit.

The rotation angle estimation unit is configured to estimate a head rotation angle of the host character based on the face orientation. The deviation angle obtaining unit is configured to calculate a difference between the head rotation angle and a standard angle corresponding to the preset indicating orientation, to obtain the deviation angle between the face orientation and the preset indicating orientation.

In a possible implementation, the live streaming video merging module 230 includes a flipped video obtaining unit. The flipped video obtaining unit is configured to flip, based on the deviation angle, the host character in the live streaming video in a horizontal direction, in a case that the deviation angle reaches the preset angle threshold and lasts for a preset time threshold, so as to obtain the flipped live streaming video.

In a possible implementation, the live streaming video merging module 230 includes a flip start position obtaining unit, a flip end position obtaining unit, and an image flipping unit.

The start flip image obtaining unit is configured to insert a flip start marker to a video image corresponding to the live streaming video to obtain a flip start position, on detecting within a preset time period that the host character in the live streaming video starts to do a designated action. The end flip image obtaining unit is configured to insert a flip end marker to a video image corresponding to the live streaming video to obtain a flip end position, on detecting that the host character in the live streaming video stops doing the designated action. The image flipping unit is configured to flip the host character in the live streaming video between the flip start position and the flip end position.

In a possible implementation, the live streaming video merging module 230 includes a merging template obtaining unit and a co-host streaming video obtaining unit.

The merging template obtaining unit is configured to obtain a preconfigured merging template of an image for the co-hosting live streaming. The co-host streaming video obtaining unit is configured to merge, based on the merging template, the flipped live streaming video with the other live streaming video participating in the co-hosting live streaming, to obtain the streaming video for the co-hosting live streaming.

In a possible implementation, the flipped live streaming video presents a guest host. The co-host streaming video obtaining unit is configured to arrange the live streaming video corresponding to a master host on a left side of the synthesis template, arrange the flipped live streaming video on a right side of the merging template, and merging based on the merging template to obtain the streaming video for the co-hosting live streaming.

The device for processing a live streaming image based on co-hosting live streaming according to the embodiments of the present disclosure can implement the method for processing a live streaming image based on co-hosting live streaming as shown in the foregoing embodiments of the present disclosure. Implementation principle of the device is similar to that of the method, which is not repeated here.

An electronic device is provided according to an embodiment of the present disclosure. The electronic device includes a memory, a processor, and at least one program. The program is stored on the memory. The program, when executed by the processor, can cause improvement of an interaction effect during the co-hosting live streaming, in comparison with the conventional technology.

Figure 5:
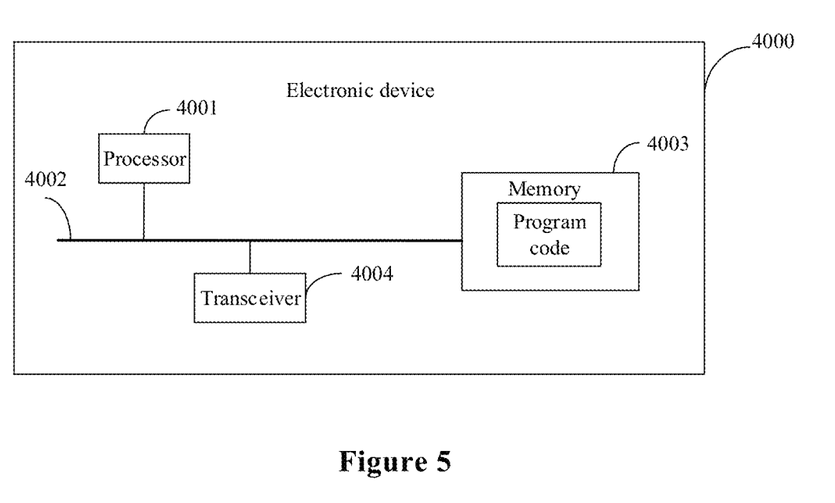
FIG. 5 is a schematic structural diagram of an electronic device for obtaining a position of an interest point in an electronic map according to an embodiment of the present disclosure.

An electronic device is provided according to an embodiment of the present disclosure. Reference is made to FIG. 5. An electronic device 4000 as shown in FIG. 5 includes a processor 4001 and a memory 4003. The processor 4001 and the memory 4003 are connected to each other via a bus 4002, for example. Alternatively, the electronic device 4000 may further include a transceiver 4004. The transceiver 4004 may be configured for data interaction between the electronic device and another electronic device. The data interaction may be, for example, at least one of sending data or receiving data. It should be noted that, the transceiver 4004 is not limited to be in a quantity of one in practice, and the structure of the electronic device 4000 does not limit the embodiments of the present disclosure.

The processor 4001 may be a central processing unit (CPU), a general-purpose processor, a digital signal processor (DSP), an application specific integrated circuit (ASIC), a field programmable gate array (FPGA) or other programmable logic devices, a transistor logic device, a hardware component, or any combination thereof. The processor can implement or execute various exemplary logical blocks, modules and circuits described in conjunction with the present disclosure. The processor 4001 may be a combination that implements a computing function. For example, the processor includes a combination of one or more microprocessors, a combination of a DSP and a microprocessor, and the like.

The bus 4002 may include a path for communicating information between the components described above. The bus 4002 may be a peripheral component interconnect (PCI) bus, an extended industry standard architecture (EISA) bus, or the like. The bus 4002 may be an address bus, a data bus, a control bus, or the like. For ease of representation, the bus is shown in FIG. 5 as one thick line, which does not imply that there is only one bus or the bus is of a single type.

The memory 4003 may be a read-only memory (ROM) or other types of static storage devices that can store static information and instructions, a random access memory (RAM) or other types of dynamic storage devices that can store information and instructions, or may be an electrically erasable programmable read-only memory (EEPROM), a compact disc read only memory (CD-ROM) or other optical disc storage, an optical disk storage (including a compression optical disc, a laser disc, an optical disc, a digital versatile disc, a Blu-ray disc, and the like), a magnetic disk storage medium or other magnetic storage device, or any other medium that can carry or store expected program code in a form of instructions or data structures and can be accessed by a computer, which is not limited herein.

The memory 4003 stores application program code for execution of the solution of the present disclosure. The execution is controlled by the processor 4001. The processor 4001 is configured to execute the application program code stored in the memory 4003, so as to implement content shown in the foregoing method embodiments.

The electronic device includes, but is not limited to: a mobile terminal such as a mobile phone, a notebook computer, a digital broadcast receiver, a personal digital assistant (PDA), a tablet computer (PAD), a portable multimedia player (PMP), and a vehicle-mounted terminal (such as vehicle-mounted navigation terminal); and a fixed terminal such as a digital TV, and a desktop computer. The electronic device shown in FIG. 5 is only an example, which should not limit the functions and application scope of the embodiments of the present disclosure.

A computer-readable storage medium is provided according to an embodiment of the present disclosure. The computer-readable storage medium stores a computer program. The computer program, when executed on a computer, causes the computer to implement the foregoing method embodiments. Compared with the conventional technology, the embodiment of the present disclosure can realize a quick flip of relevant images in a live streaming video in a case that an action of a master host or guest host does not comply with a preset indicating orientation. As a result, it is avoided that interactivity is influenced due to a mis-orientation of an action from the master host or guest host. Hence, a visual effect of interactions in the co-hosting live streaming is improved.

A computer program product or computer program is provided according to an embodiment of the present disclosure. The computer program product or computer program includes computer instructions. The computer instructions are stored in a computer-readable storage medium. A computer device, such as a processor of an electronic device, reads the computer instructions from the computer-readable storage medium. The processor executes the computer instructions, so as to implement the following steps: obtaining at least two live streaming videos for the co-hosting live streaming, and performing a face orientation recognition on at least one of the live streaming videos to determine a face orientation of a host character in the live streaming video; calculating a deviation angle between the face orientation and a preset indicating orientation; flipping the live streaming video to obtain a flipped live streaming video, in a case that the deviation angle reaches a preset angle threshold; and merging by using the flipped live streaming video to obtain a streaming video for the co-hosting live streaming.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. Specific examples of the computer readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium. The computer readable signal medium can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

The computer readable medium may be incorporated in the electronic device, or may exist alone without being assembled into the electronic device.

The computer readable medium carries one or more programs. The one or more programs, when executed by the electronic device, cause the electronic device to implement the method as described in the above embodiments.

Computer program code for performing operations of the present disclosure may be written in one or more programming languages, or a combination of the foregoing. The programming language includes, but is not limited to: object oriented programming languages such as Java, Smalltalk, and C++, and conventional procedural programming languages such as "C" language, or similar programming languages. The program codes may be executed entirely on a user computer, or be executed partly on the user computer, or be executed as a stand-alone software package, or be executed partly on the user computer and partly on a remote computer, or be executed entirely on the remote computer or server. In a case that the execution of the program code involves a remote computer, the remote computer may be connected to a user computer via any kind of network, including a local area network (LAN) or a wide area network (WAN), or may be connected to an external computer (for example, via an Internet providing by an Internet service provider).

The flow charts and block diagrams in the drawings shows the architecture, functionality and operation of possible implementations of the products of system, method and computer program provided according to the embodiments of the present disclosure. Each block in the flow charts or block diagrams may represent a module, a program segment, or a part of code. The module, program segment, or part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It should be further noted that each block in the block diagrams and/or flow charts, and combinations of blocks in the block diagrams and/or flowcharts, may be implemented by a dedicated hardware-based system which is configured to implement specified functions or operations, or may be implemented by using a combination of dedicated hardware and computer instructions.

The modules mentioned in the description of the embodiments of the present disclosure may be implemented by means of software, or otherwise by means of hardware. In some circumstances, a name of a module does not constitute a limitation on the module. For example, the face orientation determination module may also be described as "a module for determining a face orientation".

It should be understood that although the steps in the flow chart in the drawings are displayed sequentially according to the arrows, the steps are not necessarily to be executed sequentially in an order indicated by the arrows. Unless otherwise specified herein, the steps are not strictly restricted in terms of an execution order, and may be executed in other orders. Moreover, at least some of the steps in the flow charts in the drawings may include multiple sub-steps or multiple stages. The sub-steps or stages are not necessarily executed at a same time instant, but may be executed at different time instants. The sub-steps or stages are not necessarily to be executed sequentially, but may be performed alternately, or in turn, with at least a part of other steps or sub-steps or stages of another step.

Described above are merely some embodiments of the present disclosure. It should be noted that improvements and modifications can be made by those of ordinary skills in the art, without departing from the principle of the present disclosure. Such improvements and modifications should be regarded as within the protection scope of the present disclosure.

The invention claimed is:

1. A method for processing a live streaming image based on co-hosting live streaming, comprising:
    obtaining at least two live streaming videos for the co-hosting live streaming, and performing a face orientation recognition on at least one of the live streaming videos to determine a face orientation of a host character in the live streaming video;
    calculating a deviation angle between the face orientation and a preset indicating orientation;
    flipping the live streaming video to obtain a flipped live streaming video, in a case that the deviation angle reaches a preset angle threshold; and
    merging by using the flipped live streaming video to obtain a streaming video for the co-hosting live streaming.

2. The method according to claim 1, wherein the obtaining at least two live streaming videos for the co-hosting live streaming, and performing a face orientation recognition on at least one of the live streaming videos to determine a face orientation of a host character in the live streaming video comprises:
    obtaining, from a host terminal, a first live image sequence of a master host;
    obtaining, from an accessed terminal, a second live image sequence of a guest host;
    extracting feature key points of a face area in at least one of the first live image sequence and the second live image sequence;
    performing the face orientation recognition on the live streaming video based on the feature key points to obtain a face gesture of the host character in an image sequence corresponding to the extracted feature key points; and
    determining, based on the face gesture, the face orientation of the host character in the live streaming video.

3. The method according to claim 1, wherein the calculating a deviation angle between the face orientation and a preset indicating orientation comprises:
    estimating, based on the face orientation, a head rotation angle of the host character; and
    calculating a difference between the head rotation angle and a standard angle corresponding to the preset indicating orientation, to obtain the deviation angle between the face orientation and the preset indicating orientation.

4. The method according to claim 1, wherein the flipping the live streaming video, in a case that the deviation angle reaches a preset angle threshold, comprises:
    flipping, based on the deviation angle, the host character in the live streaming video in a horizontal direction, in a case that the deviation angle reaches the preset angle threshold and lasts for a preset time threshold, to obtain the flipped live streaming video.

5. The method according to claim 1, wherein the flipping the live streaming video to obtain a flipped live streaming video comprises:
    inserting a flip start marker to a video image corresponding to the live streaming video to obtain a flip start position, on detecting within a preset time period that the host character in the live streaming video starts to do a designated action;

inserting a flip end marker to a video image corresponding to the live streaming video to obtain a flip end position, on detecting that the host character in the live streaming video stops doing the designated action; and flipping the host character in the live streaming video between the flip start position and the flip end position.

6. The method according to claim 1, wherein the merging by using the flipped live streaming video to obtain a streaming video for the co-hosting live streaming comprises:

obtaining a preconfigured merging template of an image for the co-hosting live streaming; and merging, based on the merging template, the flipped live streaming video with the other live streaming video participating in the co-hosting live streaming, to obtain the streaming video for the co-hosting live streaming.

7. The method according to claim 6, wherein the flipped live streaming video presents a guest host; and the merging, based on the merging template, the flipped live streaming video with another live streaming video participating in the co-hosting live streaming, to obtain the streaming video for the co-hosting live streaming comprises:

arranging a live streaming video corresponding to a master host on a left side of the merging template, arranging the flipped live streaming video on a right side of the merging template, and merging based on the merging template to obtain the streaming video for the co-hosting live streaming.

8. An electronic device, comprising:

a memory;

a processor; and a computer program stored on the memory and executable on the processor, wherein the electronic device, when executes the computer program through the processor, is configured to:

obtain at least two live streaming videos for the co-hosting live streaming, and perform a face orientation recognition on at least one of the live streaming videos to determine a face orientation of a host character in the live streaming video;

calculate a deviation angle between the face orientation and a preset indicating orientation;

flip the live streaming video to obtain a flipped live streaming video, in a case that the deviation angle reaches a preset angle threshold; and merge by using the flipped live streaming video to obtain a streaming video for the co-hosting live streaming.

9. The electronic device according to claim 8, further configured to:

obtain, from a host terminal, a first live image sequence of a master host;

obtain, from an accessed terminal, a second live image sequence of a guest host;

extract feature key points of a face area in at least one of the first live image sequence and the second live image sequence;

perform the face orientation recognition on the live streaming video based on the feature key points to obtain a face gesture of the host character in an image sequence corresponding to the extracted feature key points; and determine, based on the face gesture, the face orientation of the host character in the live streaming video.

10. The electronic device according to claim 8, further configured to:

estimate, based on the face orientation, a head rotation angle of the host character; and calculate a difference between the head rotation angle and a standard angle corresponding to the preset indicating orientation, to obtain the deviation angle between the face orientation and the preset indicating orientation.

11. The electronic device according to claim 8, further configured to:

flip, based on the deviation angle, the host character in the live streaming video in a horizontal direction, in a case that the deviation angle reaches the preset angle threshold and lasts for a preset time threshold, to obtain the flipped live streaming video.

12. The electronic device according to claim 8, further configured to:

insert a flip start marker to a video image corresponding to the live streaming video to obtain a flip start position, on detecting within a preset time period that the host character in the live streaming video starts to do a designated action;

insert a flip end marker to a video image corresponding to the live streaming video to obtain a flip end position, on detecting that the host character in the live streaming video stops doing the designated action; and flip the host character in the live streaming video between the flip start position and the flip end position.

13. The electronic device according to claim 8, further configured to:

obtain a preconfigured merging template of an image for the co-hosting live streaming; and merge, based on the merging template, the flipped live streaming video with the other live streaming video participating in the co-hosting live streaming, to obtain the streaming video for the co-hosting live streaming.

14. The electronic device according to claim 13, wherein the flipped live streaming video presents a guest host; and the electronic device is further configure to:

arrange a live streaming video corresponding to a master host on a left side of the merging template, arrange the flipped live streaming video on a right side of the merging template, and perform merging based on the merging template to obtain the streaming video for the co-hosting live streaming.

15. A non-transitory computer-readable medium, storing a computer program, wherein the computer program, when executed by a processor, is configured to:

obtain at least two live streaming videos for the co-hosting live streaming, and perform a face orientation recognition on at least one of the live streaming videos to determine a face orientation of a host character in the live streaming video;

calculate a deviation angle between the face orientation and a preset indicating orientation;

flip the live streaming video to obtain a flipped live streaming video, in a case that the deviation angle reaches a preset angle threshold; and merge by using the flipped live streaming video to obtain a streaming video for the co-hosting live streaming.

16. The non-transitory computer-readable medium according to claim 15, wherein the computer program, when executed by a processor, is further configured to:

obtain, from a host terminal, a first live image sequence of a master host;

obtain, from an accessed terminal, a second live image sequence of a guest host;

extract feature key points of a face area in at least one of the first live image sequence and the second live image sequence;

perform the face orientation recognition on the live streaming video based on the feature key points to obtain a face gesture of the host character in an image sequence corresponding to the extracted feature key points; and determine, based on the face gesture, the face orientation of the host character in the live streaming video.

17. The non-transitory computer-readable medium according to claim 15, wherein the computer program, when executed by a processor, is further configured to:

estimate, based on the face orientation, a head rotation angle of the host character; and calculate a difference between the head rotation angle and a standard angle corresponding to the preset indicating orientation, to obtain the deviation angle between the face orientation and the preset indicating orientation.

18. The non-transitory computer-readable medium according to claim 15, wherein the computer program, when executed by a processor, is further configured to:

flip, based on the deviation angle, the host character in the live streaming video in a horizontal direction, in a case that the deviation angle reaches the preset angle threshold and lasts for a preset time threshold, to obtain the flipped live streaming video.

19. The non-transitory computer-readable medium according to claim 15, wherein the computer program, when executed by a processor, is further configured to:

insert a flip start marker to a video image corresponding to the live streaming video to obtain a flip start position, on detecting within a preset time period that the host character in the live streaming video starts to do a designated action;

insert a flip end marker to a video image corresponding to the live streaming video to obtain a flip end position, on detecting that the host character in the live streaming video stops doing the designated action; and flip the host character in the live streaming video between the flip start position and the flip end position.

20. The non-transitory computer-readable medium according to claim 15, wherein the computer program, when executed by a processor, is further configured to:

obtain a preconfigured merging template of an image for the co-hosting live streaming; and merge, based on the merging template, the flipped live streaming video with the other live streaming video participating in the co-hosting live streaming, to obtain the streaming video for the co-hosting live streaming.

* * * * *